Patented Feb. 9, 1954

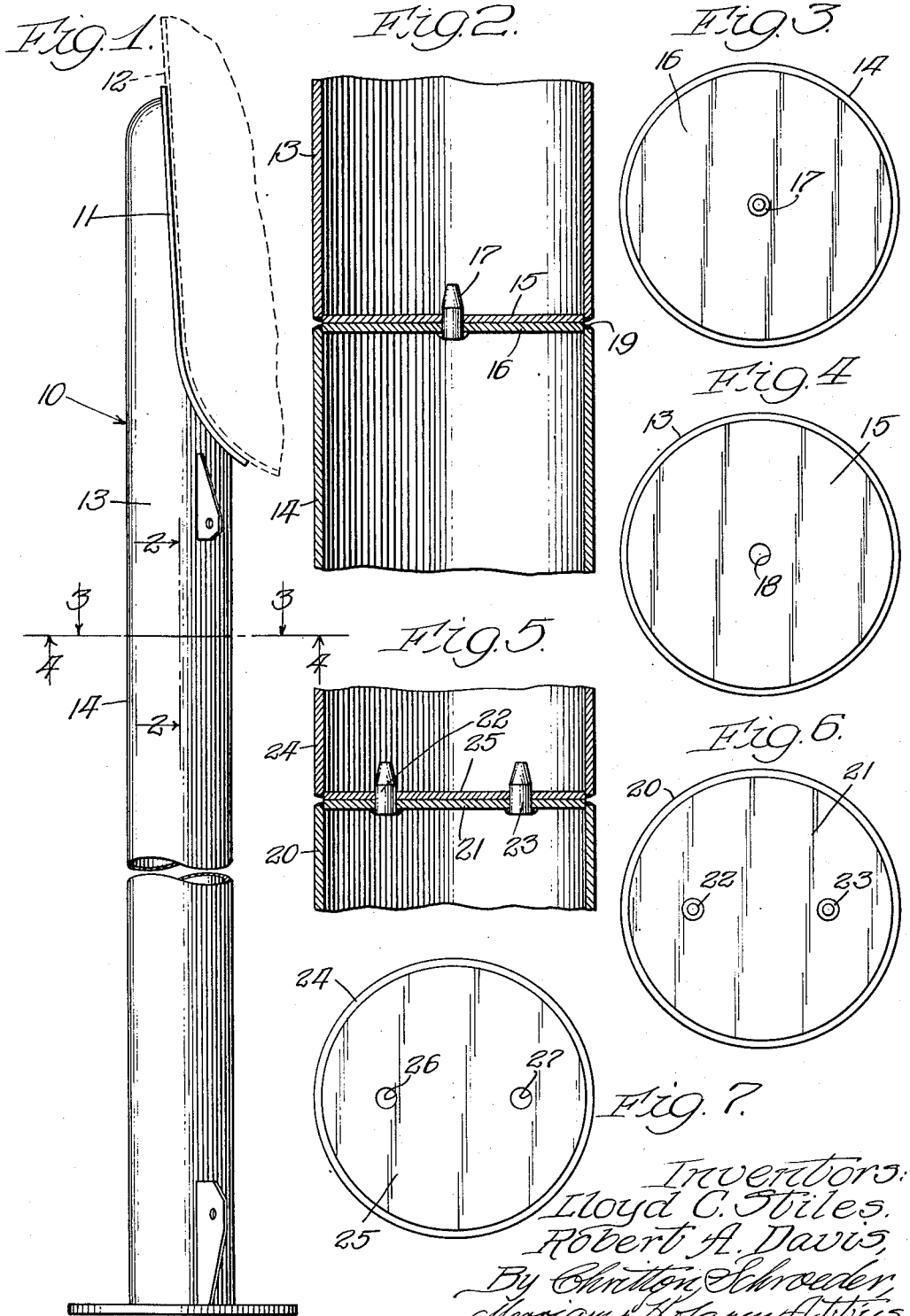

2,668,607

UNITED STATES PATENT OFFICE 2,668,607

SUPPORTING COLUMN

Lloyd C. Stiles and Robert A. Davis, Birmingham, Ala., assignors to Chicago Bridge and Iron Company, a corporation of Illinois Application August 12, 1948, Serial No. 43,864

1 Claim. (Cl. 189—38)

This invention relates to a supporting column and more particularly to a supporting column which can be shop assembled in a plurality of sections which thereafter can be field assembled with a minimum of difficulty.

Supporting columns and particularly tubular supporting columns for elevated structures such as storage tanks are generally shop assembled and shipped in a plurality of sections. At the structural site each section is positioned in end to end relationship with other sections and welded together to form a single column. It is obviously desirable that as much of the fabrication be done in the shop as is possible as field assembly is often done under difficult conditions. For example, when a tubular column is to be erected, the bottom section is first located on the foundation and the succeeding section or sections are lifted thereupon and welded thereto. It has been difficult accurately to align the sections as they are being welded together and many devices have been suggested for holding the columns in alignment while the welding is proceeding.

We have invented and are herein disclosing and claiming a tubular section which can easily be pre-fabricated in the shop and which is easily assembled in axial relationship with other sections for fabrication into a supporting column. According to our invention, we secure a diaphragm at the end of one section and weld a dowel to the diaphragm which dowel is received in an opening in a diaphragm welded to the end of another section to hold the two sections in axial alignment. If it is desired that rotation between the two columns be prevented prior to their being welded together we propose to provide more than one dowel to be positioned in corresponding openings in the diaphragm on the other section.

The invention will be described in conjunction with the embodiments shown in the accompanying drawings in which Fig. 1 is a side elevation partly in section of a tubular column embodying the invention; Figs. 2, 3 and 4 are sections along lines 2—2, 3—3 and 4—4 of Fig. 1 respectively and Figs. 5, 6 and 7 are taken like Figs. 2, 3 and 4 but show a modified form of the invention.

Referring now to the drawings, the tubular supporting column 10 is provided at its upper end with a saddle 11 to which may be welded the side plates 12 of an elevated storage tank. The column 11 is made up of a plurality of sections two of which, 13 and 14, are shown in detail in Fig. 2. To the upper section 13 is welded a diaphragm 15. It will be noted that the diaphragm is not flush with the ends of the section 13 but rather has a portion extending therebeyond for reasons to be hereinafter explained. To the lower section 14 a similar diaphragm 16 is welded in like manner. A dowel 17 is welded to the center of the diaphragm 16 and is adapted to be positioned in a hole 18 similarly located in the diaphragm 15.

The diaphragms are welded to each of the sections in the shop and serve to reinforce the tubular sections against damage while in transit to the erection site. In welding the diaphragms to the ends of the column we prefer to insert them only partially within the column so that they have a portion extending beyond the ends thereof. This provides an edge against which the weld can be made for attaching the diaphragm to the section. When a column is being assembled in the field and the section 13 is lowered on the section 14, engagement of the dowel 17 with the hole 18 centers the section 13 over section 14. In addition, by placing the diaphragms as previously described, a welding groove 19 is automatically provided between the two tubular sections and it is therefore unnecessary to grind a V-shaped groove at the juncture line of the sections.

In placing the uppermost section 13 in position it is often necessary that it be rotated slightly relative to section 14 accurately to align the saddle 11 to conform with the shape of the proposed tank. By the provision of a single dowel 17 centrally located as shown, it is possible to rotate the section 13 prior to the welding of that section to section 14 while maintaining the sections together in axial alignment.

When extremely high elevated structures are to be constructed and the supporting columns will comprise more than two sections, we prefer to modify our invention for at least the lower sections to the type shown in Figs. 5, 6 and 7. In the embodiment shown in those figures the lower column 20 has welded thereto a diaphragm 21 carrying two dowels 22 and 23 and the intermediate section 24 has a diaphragm 25 having two openings 26 and 27. The employment of two openings and two dowels obviously not only locates the section 24 in axial alignment with the section 20 but also prevents rotation of section 24 relative to section 20 prior to the application of the weld.

The diaphragms and dowels of course remain in the completed structure wherein they serve to reinforce the tubular sections.

While we have shown and described certain embodiments of our invention as used in conjunction with an elevated tank having tubular supporting columns it is obvious that the invention may be used with other elevated structures having supporting columns of various shapes and accordingly it is not our intention that our invention be limited to the specific exemplary embodiments disclosed. On the contrary, it is our intention to cover all modifications and alternative constructions falling within the spirit and scope of the invention as defined in the appended claim.

We claim:

A column structure for supporting an elevated liquid storage tank, comprising: a continuous tubular steel column having a plurality of tubular sections permanently joined endwise together forming said continuous column, each section having a diaphragm welded in the end thereof and positioned to uniformly extend a predetermined distance from the end of the section to abut in face to face relationship a similar diaphragm in an adjoining section, said abutting diaphragms spacing the adjoining ends of the column sections and forming with the ends of the sections a peripheral groove thereabout for receiving the weld metal which permanently joins said sections; and column section aligning means in said diaphragms including at least one outwardly extending dowel in one diaphragm with the other diaphragm having an opening to receive the dowel.

LLOYD C. STILES.
ROBERT A. DAVIS.

References Cited in the file of this patent

UNITED STATES PATENTS

| Number | Name | Date |
|---|---|---|
| 449,777 | Hall | Apr. 7, 1891 |
| 825,069 | Peirce | July 3, 1906 |
| 837,912 | Brown | Dec. 11, 1906 |
| 1,138,826 | Younis | May 11, 1915 |
| 1,630,037 | Stresau | May 24, 1927 |